US011890752B2

(12) United States Patent
Lee et al.

(10) Patent No.: US 11,890,752 B2
(45) Date of Patent: Feb. 6, 2024

(54) COMPLEX ELASTIC UNIT FOR MAXIMIZING SPACE UTILIZATION AND ELASTIC ENERGY STORAGE WITHIN LIMITED SPACE AND VARIABLE GRAVITY COMPENSATION MODULE WITH THE COMPLEX ELASTIC UNIT AND CURVED LEVER

(71) Applicant: Chung Ang University Industry Academic Cooperation Foundation, Seoul (KR)

(72) Inventors: Giuk Lee, Gyeonggi do (KR); Jehyeok Kim, Gyeonggi do (KR); Jun Young Moon, Seoul (KR); Jae Wook Ryu, Seoul (KR)

(73) Assignee: Chung Ang University Industry Academic Cooperation Foundation, Seoul (KR)

( * ) Notice: Subject to any disclaimer, the term of this patent is extended or adjusted under 35 U.S.C. 154(b) by 0 days.

(21) Appl. No.: 17/241,692

(22) Filed: Apr. 27, 2021

(65) Prior Publication Data
US 2022/0184821 A1    Jun. 16, 2022

(30) Foreign Application Priority Data

Dec. 15, 2020   (KR) .......................... 10-2020-0175513
Dec. 15, 2020   (KR) .......................... 10-2020-0175514

(51) Int. Cl.
   *B25J 19/00*   (2006.01)
(52) U.S. Cl.
   CPC .................. *B25J 19/0016* (2013.01)
(58) Field of Classification Search
   CPC .......................... B25J 19/0016; B25J 19/0008
   See application file for complete search history.

(56) References Cited

U.S. PATENT DOCUMENTS

| | | | | |
|---|---|---|---|---|
| 4,756,204 A * | 7/1988 | Wittwer | ............... | B25J 19/0016 74/109 |
| 6,253,458 B1 * | 7/2001 | Raab | ...................... | G01B 5/008 33/503 |
| 9,186,222 B2 * | 11/2015 | Marincek | ............... | A61B 90/50 |

FOREIGN PATENT DOCUMENTS

| | | | |
|---|---|---|---|
| KR | 101772285 B1 | 8/2017 | |
| KR | 101841171 B1 | 5/2018 | |
| (Continued) | | | |

*Primary Examiner* — Jake Cook
(74) *Attorney, Agent, or Firm* — Akerman LLP

(57) ABSTRACT

The present invention relates to a complex elastic unit for maximizing space utilization and elastic energy storage with a limited space and a variable gravity compensation module with the complex elastic unit and a curved lever, more particularly to variable gravity compensation apparatus with a curved lever, characterized by comprising: a housing; an interlocking cam which is installed to the housing, being rotated by a load; a curved lever which is rotated interlocked with the rotation of the interlocking cam and which provides elasticity to rotate the interlocking cam toward an initial position; an adjustment unit which adjusts a position of a pivot which is a center of rotation of the curved lever, allowing moving the pivot according to strength of load; and an elastic unit which is equipped within the housing to provide elasticity to the curved lever, wherein a driving end which is adhered to the interlocking cam is formed on one end of the curved lever with respect to the pivot, a driven end which is adhered to an elastic follower equipped to the elastic unit is formed on the other end thereof, and the driven end is configured into a curved shape that a sectional side surface connecting the pivot to the elastic follower has a particular curvature.

5 Claims, 23 Drawing Sheets

(56) References Cited

FOREIGN PATENT DOCUMENTS

KR      102152163 B1    9/2020
KR      102154922 B1    9/2020

* cited by examiner

COMPLEX ELASTIC UNIT FOR MAXIMIZING SPACE UTILIZATION AND ELASTIC ENERGY STORAGE WITHIN LIMITED SPACE AND VARIABLE GRAVITY COMPENSATION MODULE WITH THE COMPLEX ELASTIC UNIT AND CURVED LEVER

CROSS-REFERENCE TO RELATED APPLICATIONS

The present application claims priority to Korean Patent Application No. 10-2020-0175513, filed on Dec. 15, 2020 and Korean Patent Application No. 10-2020-0175514, filed on Dec. 15, 2020, the entire contents of which are incorporated herein by reference.

BACKGROUND

Technical Field

The present invention relates to a complex elastic unit for maximizing space utilization and elastic energy storage with a limited space and a variable gravity compensation module with the complex elastic unit and a curved lever.

Description of the Related Art

A gravitational torque is a factor that overtasks a joint of a mechanical system. Thus, energy efficiency may be increased by compensating the gravitational torque to decrease the same.

In particular, since, in a case of a mobile system such as a mobile manipulator, a power source thereof depends solely on a mounted battery, energy efficiency is very crucially important. Accordingly, gravity compensation is needed.

Since the mobile manipulator works while moving, this is exposable to atypical environment and a weight of a load object handled by this is changed frequently.

Therefore, raised is the necessity for a variable gravity compensation apparatus which is superior to a gravity compensation apparatus that merely compensates a fixed load, and which is thus capable of corresponding to variable load.

Furthermore, in a case of the mobile manipulator, a movable volume of and a loading performance of a mobile platform are limited and thus it is needed to develop the variable gravity compensation apparatus as a micro compact module so as to be used effectively.

The gravity compensation apparatus and the variable gravity compensation apparatus have been being used for an industrial manipulator, an elevator, etc., for a long time.

Recently, technical field where the gravity compensation apparatus and the variable gravity compensation are significantly required is the field of the aforementioned manipulation robot—1) a mobile manipulator; and 2) an exoskeleton robot.

FIG. 1 and FIG. 2 shows a schematic view of a gravity compensation apparatus, in which the occupied volume is reduced by utilizing a conventional link crane space. As shown in FIG. 1 and FIG. 2, the gravity compensation apparatus is adopted to save energy in a manipulator. Gravity compensation mechanism is inserted inside a link or a spring is disposed outside the link in order to reduce the occupied volume of the gravity compensation apparatus. However, if the gravity compensation apparatus uses the link space for the purpose of volume reduction as shown in FIG. 1 and FIG. 2, a center of gravity is changed, resulting in dynamic performance degradation. Further, this is not a module type and thus it is difficult to be adopted to an existing manipulator, and has no variability and thus it is impossible to correspond to a weight change of the load.

FIG. 3 to FIG. 5 show a conventional gravity compensation apparatus which obtains variability by adopting additional mechanism. As shown in FIG. 3 to FIG. 5, for the variable gravity compensation apparatus, the variability of a gravitational torque is obtained by: adopting a method 1) to change an attachment position of a spring; and 2) to change an initial compression displacement of the spring.

However, as a torque variation method needs energy, the variability results in degradation of overall energy efficiency in the gravity compensation apparatus. Since the torque variation method needs energy, a relatively big sized driver should be used (resulting in volume increment). Further, this gravity compensation apparatus is not a module type and thus it is difficult to be adopted to a mobile manipulator.

FIG. 6 shows a schematic view of a gravity compensation apparatus for minimizing variable energy. As shown in FIG. 6, energy is stored in an inner spring structure in advance in order to save energy required during the variation with additional energy storage mechanism.

However, this gravity compensation apparatus needs addition of the mechanism with a complex structure and is capable of being adopted to a parallel typed manipulators only.

FIG. 7 is a perspective view of a compact compensation module and FIG. 8 is a front view of a variable gravity compensation module, these fall into prior registered patents of the inventor of the present invention. In a case of FIG. 7, the compact compensation module falls into a compact joint module which is attachable to and detachable from an existing robot easily but has no variability. In the meantime, in a case of FIG. 8, the variable gravity compensation module falls into a compact joint module having variability but energy is required during torque variation and thus this is disadvantageous for micro miniaturization. Further, since 'maximum compensation torque' is too low and there should be 'energy required for variation', this is a limitation that practical performance is insufficient.

PRIOR ART DOCUMENT

Patent Document (Patent Document 1) Korean Patent No. 10-2152163
(Patent Document 2) Korean Patent No. 10-1841171
(Patent Document 3) Korean Patent No. 10-2154922
(Patent Document 4) Korean Patent No. 10-1772285

SUMMARY OF THE INVENTION

Therefore, the present invention is provided to solve the aforementioned problems of the prior art. According to an embodiment of the present invention, an object to be achieved is to provide a variable gravity compensation module with a curved laver, which may maximize variable gravity compensation performance and reduce the volume of an apparatus dramatically.

According to an embodiment of the present invention, an object to be achieved is to increase energy efficiency of a mobile manipulation system and torque performance of a driver revolutionary, compared to existing large, non-module typed variable gravity compensation apparatuses.

Further, according to an embodiment of the present invention, an object to be achieved is to provide a variable gravity compensation apparatus which is developed as a module type to be easily installed and used without modification of the structure of an existing system and which is adopted with an innovative curved lever to overcome limitations of the existing variable gravity compensation apparatus.

Further, according to an embodiment of the present invention, an object to be achieved is to increase a magnitude of maximum compensation torque, wherein a shape of a curved lever may be determined through systematic algorithm based on 'Lagrangian mechanics' and a complex spring is created and adopted to increase the amount of storable elastic energy.

Further, according to an embodiment of the present invention, an object to be achieved is to provide a variable gravity compensation apparatus with a curved lever, wherein detailed mechanical elements composing an apparatus may be designed into 3D shapes, allowing a micro compact design and a curved lever is adopted, allowing 1) maximizing a magnitude of maximum compensation torque, 2) extending a variable range of a compensation torque and 3) minimizing energy needed for variation.

Further, according to an embodiment of the present invention, an object to be achieved is to provide a variable gravity compensation module wherein maximum compensation torque and a variable range may be maximized compared to a volume, energy required for variation may be removed through a curved lever, allowing maximizing energy efficiency and achieving minimizing a volume of and a mass of a driving portion for variation, an innovative, crucial technology m developed, allowing adoption to various robots, and gravity compensation for various variable loads may be accomplished using a small amount of energy.

Meanwhile, technical objects to be solved in the present invention are not limited to the aforementioned objects, and other not-mentioned technical objects will be obviously understood by those skilled in the art from the description below.

According to a first aspect of the present invention, a variable gravity compensation apparatus with a curved lever includes: a housing; an interlocking cam which is installed to the housing, being rotated by a load; a curved lever which is rotated interlocked with the rotation of the interlocking cam and which provides elasticity to rotate the interlocking cam toward an initial position; an adjustment unit which adjusts a position of a pivot which is a center of rotation of the curved lever, allowing moving the pivot according to a load magnitude; and an elastic unit which is equipped within the housing to provide elasticity to the curved lever, wherein a driving end which is adhered to the interlocking cam is formed on one end of the curved lever with respect to the pivot, a driven end which is adhered to an elastic follower equipped to the elastic unit is formed on the other end thereof, and the driven end is configured into a curved shape that a sectional side surface connecting the pivot to the elastic follower has a particular curvature.

Further, according to another aspect of the present invention, a cam surface formed on an outer surface of the interlocking cam is formed to be bilateral symmetry with respect to a center line, the housing is equipped with a cam follower which slides interlocked with the rotation of the interlocking cam, and the cam follower is adhered to the driving end.

Further, another aspect of the present invention, the adjustment unit comprises an adjustment portion guide which is installed and fixed within the housing, an adjustment member which slides along the adjustment portion guide, and a driving motor which drives the adjustment member.

Further, another aspect of the present invention, a curved surface of the curved lever has a shape allowing neither the cam follower nor the elastic follower to be moved during a torque variation mode in which the position of the pivot is varied by the adjustment unit.

Further, another aspect of the present invention, in the housing, a cam follower slot in which the cam follower slides; and an elastic member slot which is equipped to one side of the elastic unit and along which a first elastic guide with an installed first elastic follower slides; are formed, respectively.

Further, another aspect of the present invention, the elastic unit is configured as a complex elastic unit which is composed of combined, different elastic members.

Further, another aspect of the present invention, the complex elastic unit is configured with a coil spring set in which at least one spring coil is connected in parallel and at least one plate spring which is disposed in series with the coil spring set.

Further, another aspect of the present invention, the coil spring set includes at least one elastic spring slot into which each coil spring is inserted, a first elastic follower coupled to an end of one side of the coil spring and a second follower coupled to an end of another side thereof.

Further, another aspect of the present invention, the coil spring set comprises, in one side, a first guide to which the first elastic follower is coupled and which is coupled to one end of the spring coil and in another side, a second guide to which the second elastic follower is coupled and which is coupled to another end of the spring coil.

Further, another aspect of the present invention, one side of the plate spring is contacted to the second elastic follower and another end thereof is coupled to a plate spring-fixing portion which is fixed to the housing.

Further, another aspect of the present invention, during torque variation mode, the adjustment member moves along the adjustment portion guide by driving of the driving motor, varying a position of the pivot, and positions of the cam follower, the first elastic follower and the second elastic followers are not varied.

Advantageous Effects

According to an embodiment of the present invention, an effect to be accomplished is to provide a variable gravity compensation module with a curved laver, which may maximize variable gravity compensation performance and reduce the volume of an apparatus dramatically.

According to an embodiment of the present invention, an effect to be accomplished is to increase energy efficiency of a mobile manipulation system and torque performance of a driver revolutionary, compared to existing large, non-module typed variable gravity compensation apparatuses.

Further, according to an embodiment of the present invention, an effect to be accomplished is to provide a variable gravity compensation apparatus which is developed as a module type to be easily installed and used without modification of the structure of an existing system and which is adopted with an innovative curved lever to overcome limitations of the existing variable gravity compensation apparatus.

Further, according to an embodiment of the present invention, an effects to be accomplished is to increase a magnitude of maximum compensation torque, wherein a shape of a curved lever may be determined through systematic algorithm based on 'Lagrangian mechanics' and a complex spring is created and adopted to increase the amount of storable elastic energy.

Further, according to an embodiment of the present invention, an effect to be accomplished is to provide a variable gravity compensation apparatus with a curved lever, wherein detailed mechanical elements composing an apparatus may be designed into 3D shapes, allowing a micro compact design and a curved lever is adopted, allowing 1) maximizing a magnitude of maximum compensation torque, 2) extending a variable range of a compensation torque and 3) minimizing energy needed for variation.

Further, according to an embodiment of the present invention, an effect to be accomplished is to provide a variable gravity compensation module wherein maximum compensation torque and a variable range may be maximized compared to a volume, energy required for variation may be removed through a curved lever, allowing maximizing energy efficiency and achieving minimizing a volume of and a mass of a driving portion for variation, an innovative, crucial technology m developed, allowing adoption to various robots, and gravity compensation for various variable loads may be accomplished using a small amount of energy.

Meanwhile, the effects to be achieved by the present disclosure are not limited to the aforementioned effects and other effects, which are not mentioned above, will be apparent to those skilled in the art from the following description.

BRIEF DESCRIPTION OF THE DRAWING

The accompanying drawings in the specification illustrate an embodiment of the present invention. The technical essence of the present disclosure will be more clearly understood from the following detailed description taken in conjunction with the accompanying drawings. Therefore, the present invention will not be interpreted to be limited to the drawings in which.

DETAILED DESCRIPTION OF THE EMBODIMENTS

Figure 1:
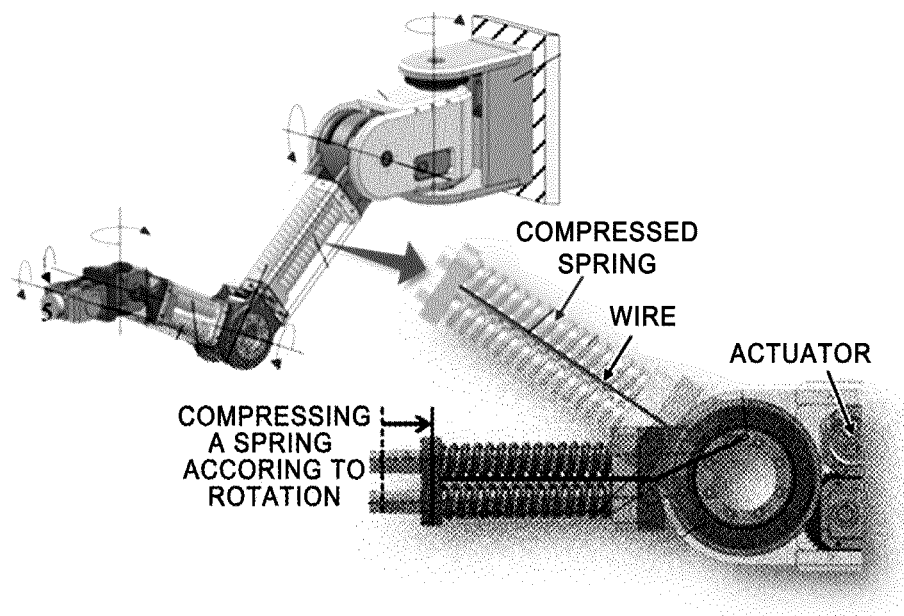
FIG. 1 and FIG. 2 show a schematic view of a gravity compensation apparatus, in which the occupied volume is reduced by utilizing a conventional link crane space.
Figure 2:
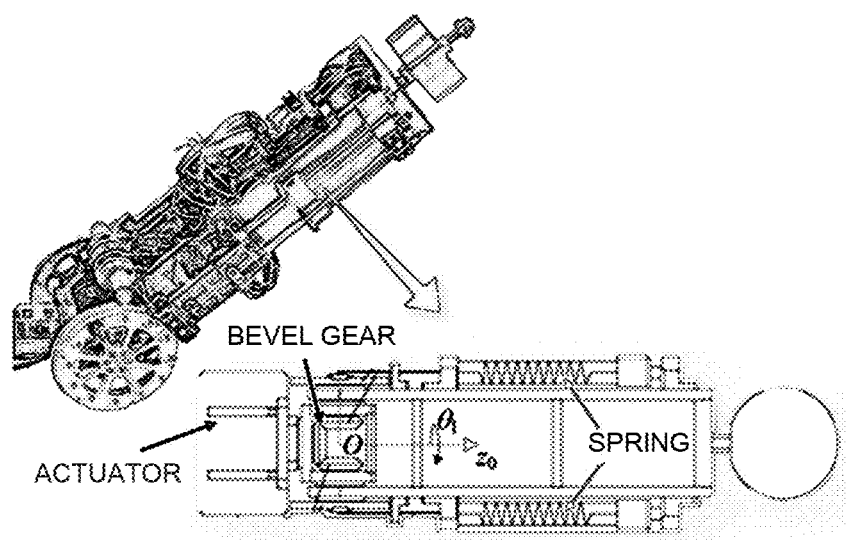
Figure 3:
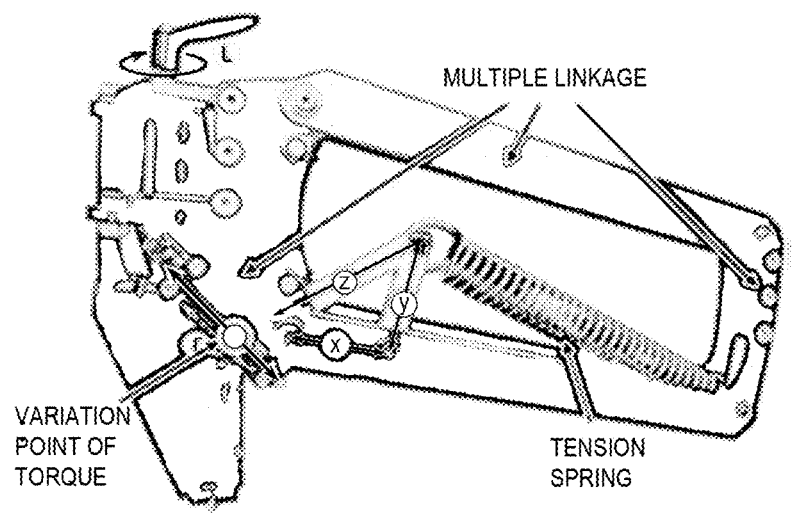
FIG. 3 to FIG. 5 show a conventional gravity compensation apparatus which obtains variability by adopting additional mechanism.
Figure 4:
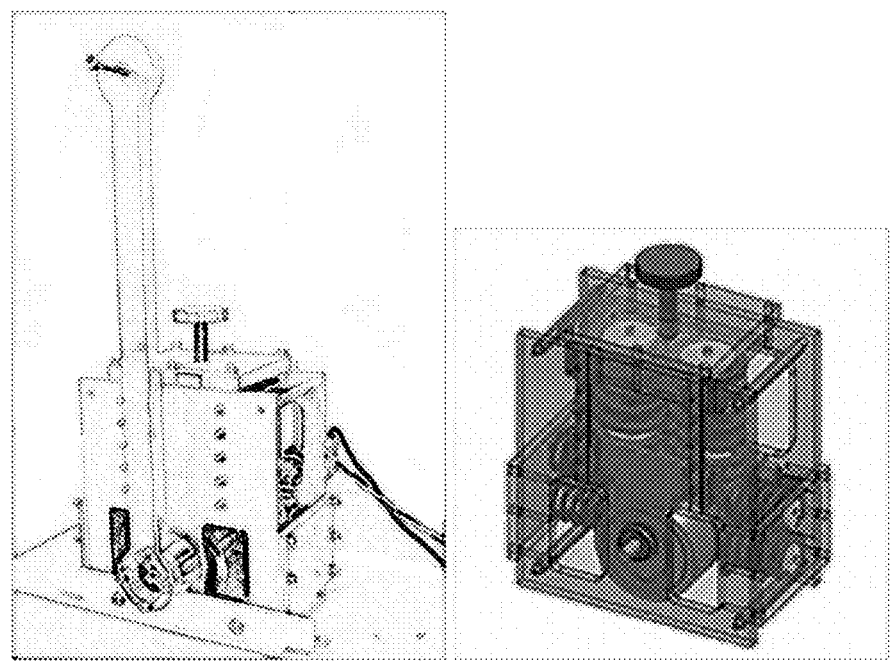
Figure 5:
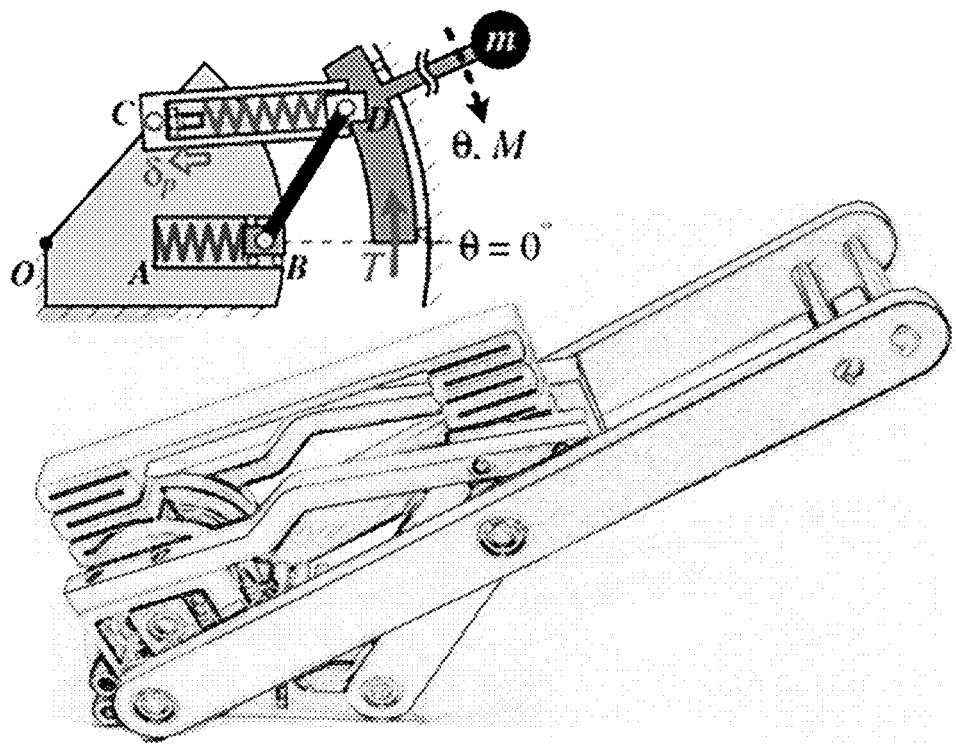
Figure 6:
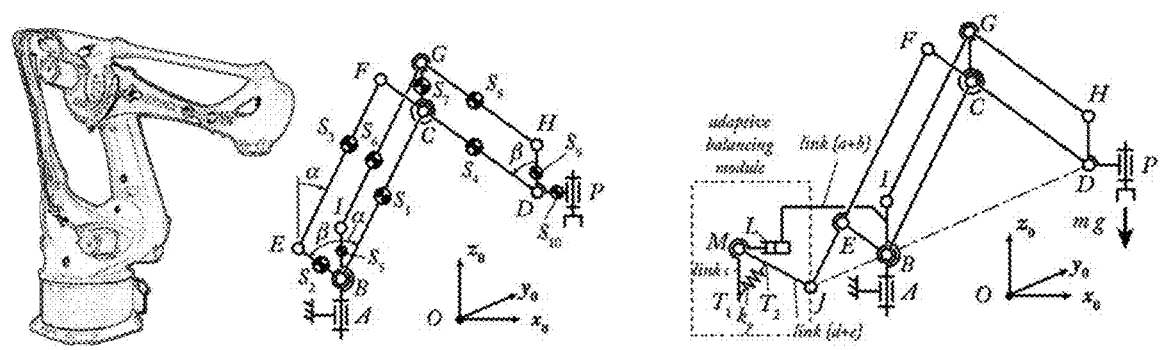
FIG. 6 shows a schematic view of a gravity compensation apparatus for minimizing variable energy.
Figure 7:
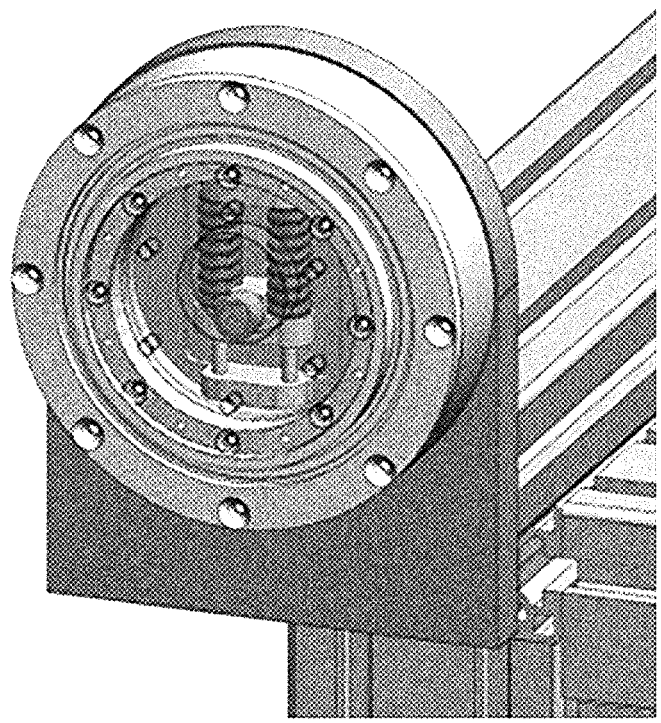
FIG. 7 is a perspective view of a compact compensation module and FIG. 8 is a front view of a variable gravity compensation module.
Figure 8:
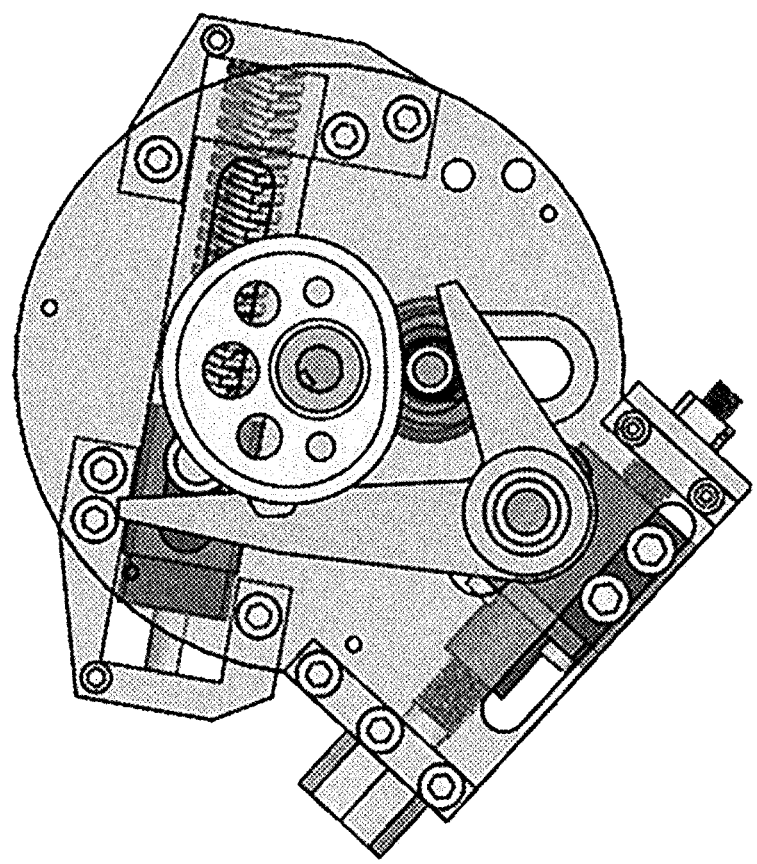

The above and other objects, features and other advantages of the present disclosure will be more clearly understood from the following detailed description taken in conjunction with the accompanying drawings. As those skilled in the art would realize, the present disclosure is not limited to the described embodiments, but may be embodied in different ways. On the contrary, exemplary embodiments introduced herein are provided to make disclosed contents thorough and complete and sufficiently transfer the essence of the present invention to those skilled in the art.

In this specification, when a component is referred to as being "on" another component, it may be directly on the other component, or an intervening third component may be present. Further, in the drawings, the thicknesses of components are exaggerated for effectively describing the technical contents.

Exemplary embodiments described in this specification may be described with reference to cross-sectional views and/or plan views which are ideal exemplary views of the present disclosure. Further, in the drawings, the thicknesses of film and regions are exaggerated for effectively describing the technical contents. Therefore, a shape of the exemplary view may be modified by a manufacturing technology and/or an allowable error. Accordingly, exemplary embodiments of the present disclosure are not limited to specific illustrated types, but may include modified types which are generated in accordance with the manufacturing process. For example, a region illustrated to have a right angle may be rounded or have a predetermined curvature. Therefore, regions illustrated in the drawings have properties. Shapes of the regions illustrated in the drawings are provided to illustrate a specific shape of a region of an element, but not limit the scope of the present disclosure. Although the terms "first", "second", and the like are used for describing various components, these components are not confined by these terms. These terms are merely used for distinguishing one component from the other components. Exemplary embodiments described herein include complementary embodiments thereof.

The terms used in the present specification are for explaining the embodiments rather than limiting the present invention. Unless particularly stated otherwise in the present specification, a singular form also includes a plural form. The term "comprises" and/or "comprising" used in this specification does not exclude the existence or addition of one or more other components.

When the following specific exemplary embodiments are described, various specific contents are provided for more specific description and understanding of the present disclosure. However, those skilled in the art may understand that the specific exemplary embodiment may be described without using the various specific contents. In some cases, a configuration which is generally known and does not directly relate to the present disclosure will be omitted in order to avoid confusion.

Hereinafter, described are configurations, functions and an operation method of a variable gravity compensation module with a curved lever according to an embodiment of the present invention.

Figure 9:
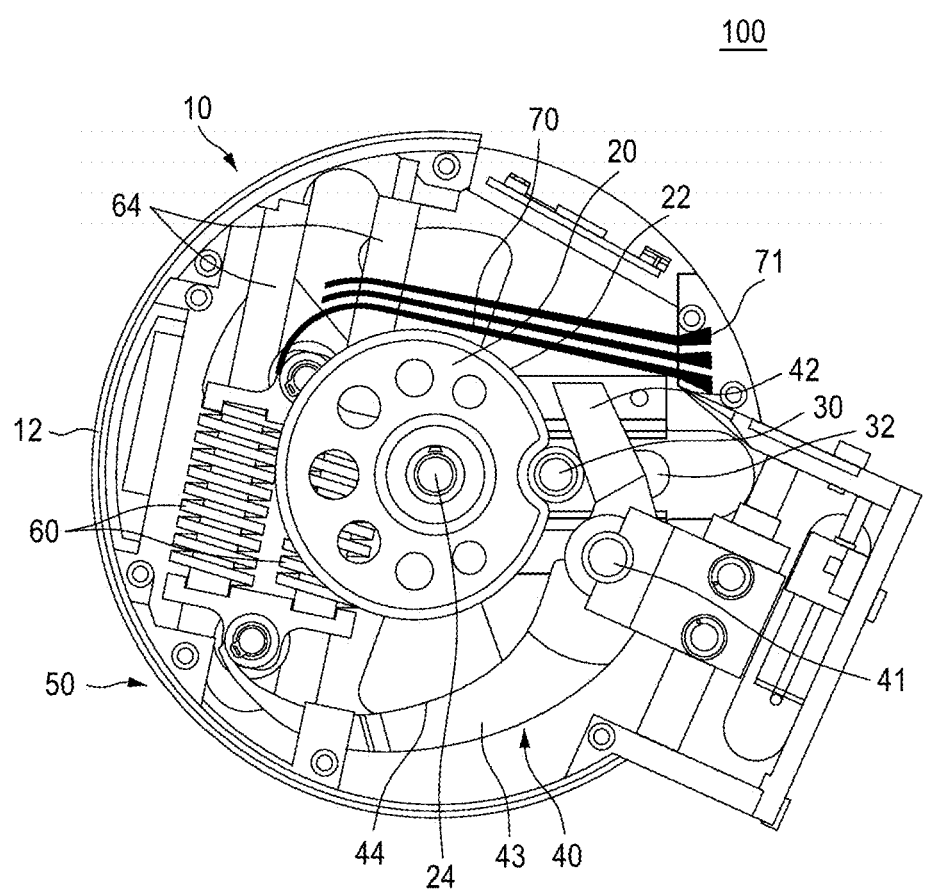
FIG. 9 is a top view of a variable gravity compensation module with a curved lever according to an embodiment of the present invention.
Figure 10:
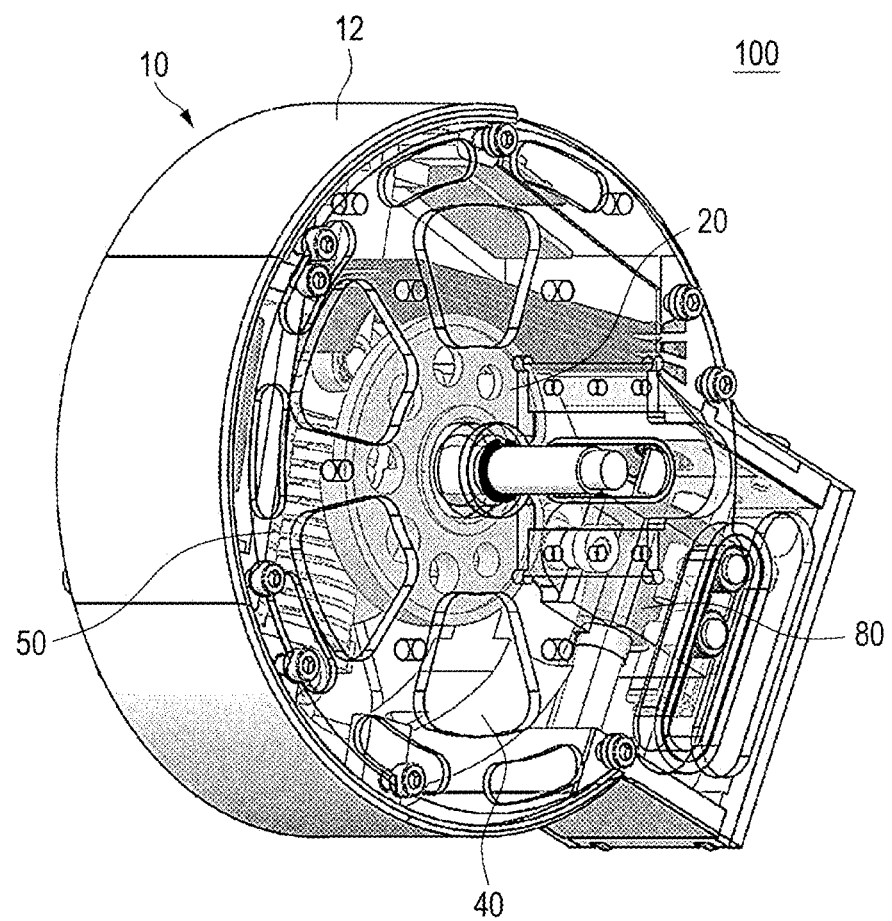
FIG. 10 is a perspective view of a variable gravity compensation module with a curved lever according to an embodiment of the present invention.
Figure 11:
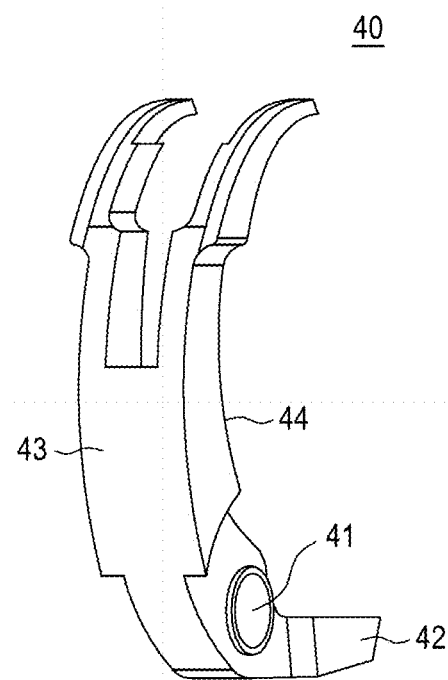
FIG. 11 is a perspective view of a curved lever according to an embodiment of the present invention.
Figure 12:
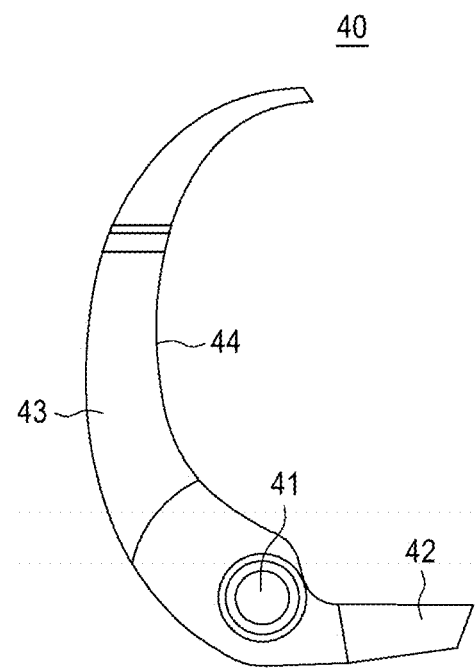
FIG. 12 is a side view of a curved lever according to an embodiment of the present invention.

Firstly, FIG. 9 is a top view of a variable gravity compensation module with a curved lever according to an embodiment of the present invention, and FIG. 10 is a perspective view of a variable gravity compensation module with a curved lever according to an embodiment of the present invention, FIG. 11 is a perspective view of a curved lever according to an embodiment of the present invention, and FIG. 12 is a side view of a curved lever according to an embodiment of the present invention.

Figure 13:
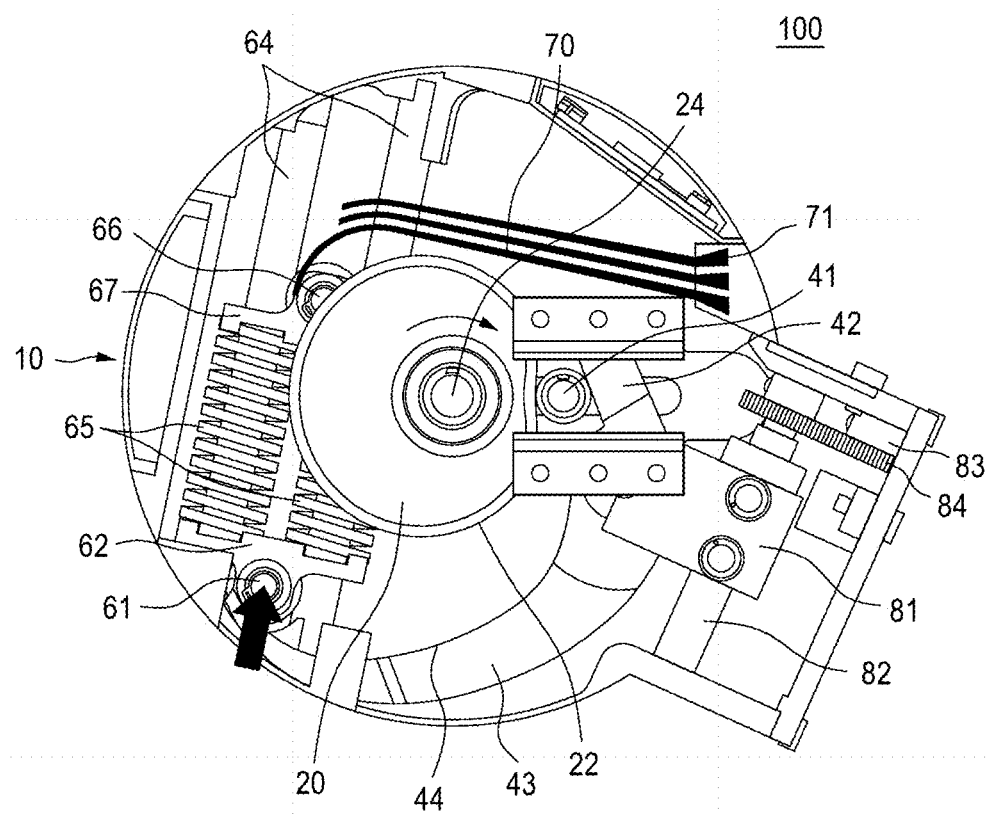
FIG. 13 is a top view of a curved lever according to an embodiment of the present invention.
Figure 14:
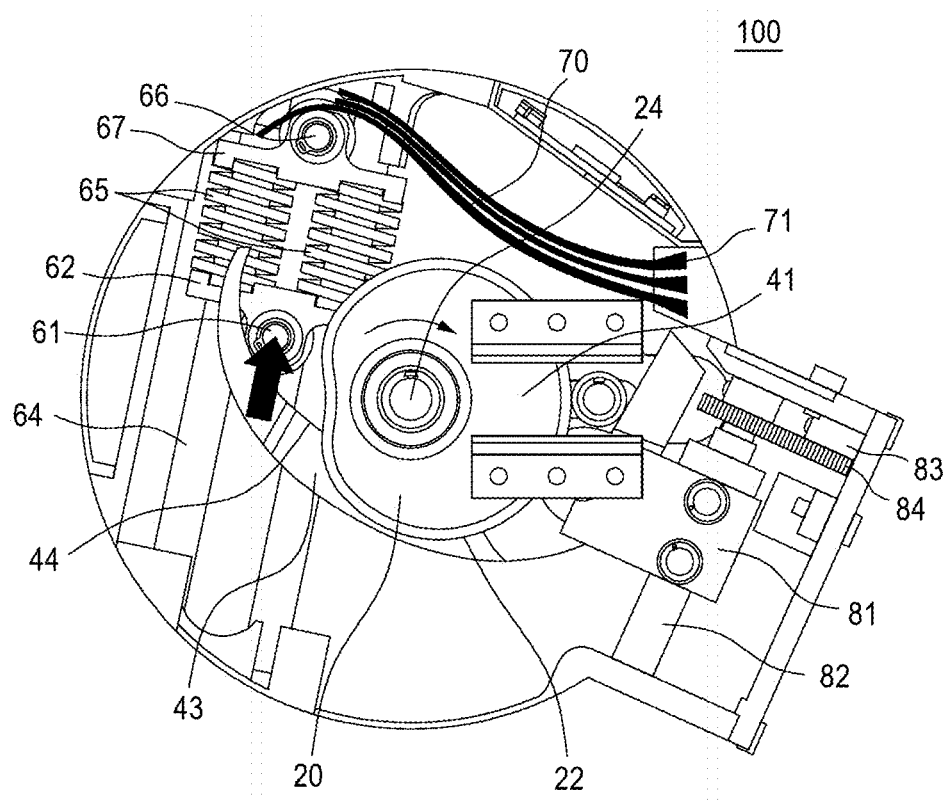
FIG. 14 is a top view of a variable gravity compensation module with a curved lever in a state that an interlocking cam rotates 180 degrees.

FIG. 13 is a top view of a curved lever according to an embodiment of the present invention, and FIG. 14 is a top view of a variable gravity compensation module with a curved lever in a state that an interlocking cam rotates 180 degrees.

As shown in FIGS. 9 to 14, a variable gravity compensation module 100 with a curved lever according to an embodiment of the present invention may be configured to include: a housing 10; an interlocking cam 20 which is installed to the housing 10, being rotated by a load; a curved lever 40 which is rotated interlocked with the rotation of the interlocking cam 20 and which provides elasticity to rotate the interlocking cam 20 toward an initial position; an adjustment unit 80 which adjusts a position of a pivot 41 which is a center of rotation of the curved lever 40, allowing moving the pivot according to strength of load; and an elastic unit 50 which is equipped within the housing 10 to provide elasticity to the curved lever 40.

According to the embodiment of the present invention, as shown in FIG. 11 and FIG. 12, a driving end 42 which is adhered to the interlocking cam 20 is formed on one end of the curved lever 40 with respect to the pivot 41, a driven end 43 which is adhered to an elastic follower 61 equipped to the elastic unit 50 is formed on the other end thereof, and the driven end 43 is configured into a curved shape that a sectional side surface connecting the pivot 41 to the elastic follower 61 has a particular curvature.

A shape of the curved lever 40 may be determined through systematic algorithm based on 'Lagrangian mechanics' and the curved lever 40 is adopted, allowing 1) maximizing a magnitude of maximum compensation torque, 2) extending a variable range of a compensation torque and 3) minimizing energy needed for variation.

The housing 10 is a part that forms an overall exterior of the variable gravity compensation apparatus 100. In the embodiment of the present invention, as shown in FIG. 9 and FIG. 10, the housing 10 is configured with two exterior plates 12 and various components are installed between the exterior plates 12 and on outer surfaces thereof. In the instant drawings, the housing 10 is configured around the two exterior plates 12, however, this is not limited thereto. Alternatively, this may be configured with one exterior plate and also configured into a different plate shape.

In the housing 10, an interlocking cam 10 is installed rotatively around a cam shaft 24. The interlocking cam 20 is coupled to a joint member (not illustrated) into which a load is input and then rotates interlocked with the rotation of the joint member. A cam surface 22 is formed on an outer circumferential surface of the interlocking cam 20. The cam surface 22 is formed to be bilateral symmetry with respect to a center line. When the cam surface 22 is formed to be bilateral symmetry like the above, it is allowable to compensate variable gravity no matter in which direction the interlocking cam 20 is rotated. For example, when the instant variable gravity compensation apparatus 100 is adopted to a robot arm, this is used in a direction in which the arm is folded or in which the folded arm is stretched, freely without directional limits.

Further, in the housing 10, a cam follower 30 is installed which slides interlocked with the rotation of the interlocking cam 20. The cam follower 30 slides along a cam follower slot 32 which is formed on the exterior plate 12 configuring the housing 10. The cam follower 30 is adhered to the cam surface 22 of the interlocking cam 20 and then slides toward a direction away from the interlocking cam 20 more than an initial position thereof when the interlocking follower 30 is rotated.

The curved lever 40 is also installed on the housing 10 and rotated around the pivot 41. The curved lever 41 provides elasticity to rotate the interlocking cam 20 toward an initial position. Substantially this is installed to be interlocked with a complex elastic unit 50 and thus is provided with elasticity therefrom.

As mentioned above, the driving end 42 which is adhered to the interlocking cam 20 is formed on one end of the curved lever 40 with respect to the pivot 41, the driven end 43 which is adhered to an elastic follower 61 equipped to the elastic unit 50 is formed on the other end thereof, and the driven end 43 is configured into a curved shape that a sectional side surface connecting the pivot 41 to the elastic follower 61 has a particular curvature.

Further, as described hereinafter, a curved surface 44 of the curved lever 40 has a shape allowing neither the cam follower 30 nor the elastic follower (61, 66) to be moved during a torque variation mode in which the position of the pivot is varied by the adjustment unit 80.

That is, during the torque variation mode, the adjustment member 81 moves along the adjustment portion guide 82 by the driving motor 83, the position of the pivot 41 is varied, while positons of the cam follower 30 and the first and second elastic followers 61 and 66 are not varied.

Accordingly, a shape of the curved lever 40 may be determined through systematic algorithm based on 'Lagrangian mechanics' and the curved lever 40 is adopted, allowing 1) maximizing a magnitude of maximum compensation torque, 2) extending a variable range of a compensation torque and 3) minimizing energy needed for variation.

Figure 15:
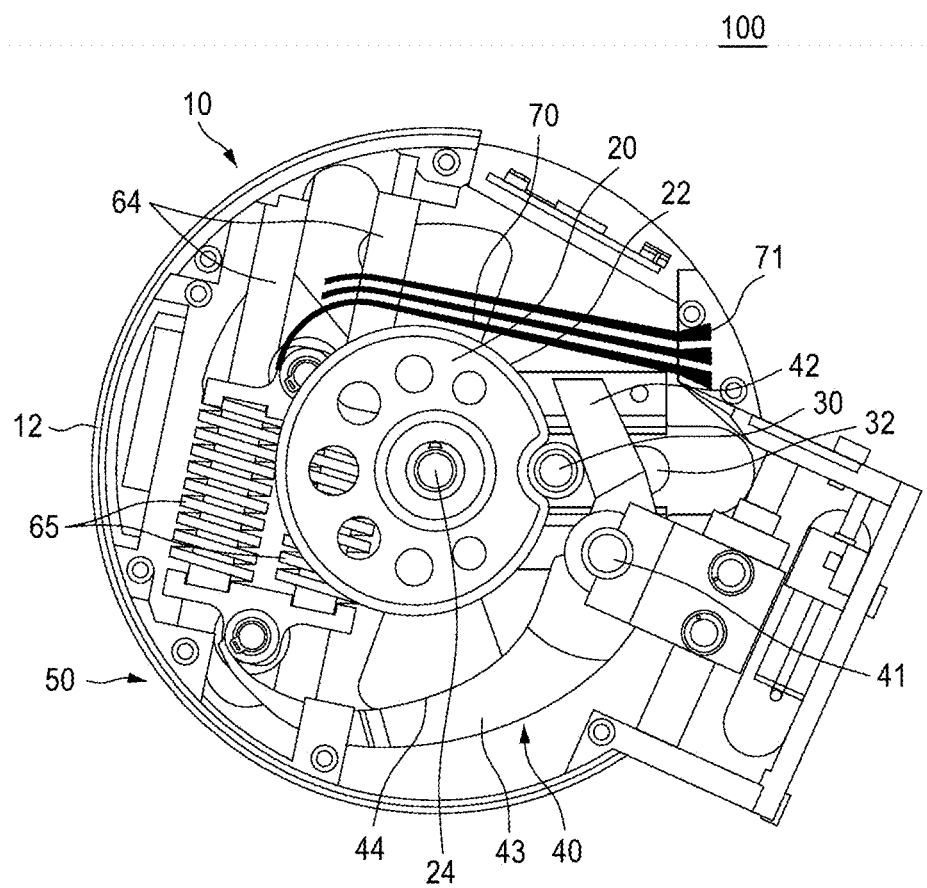
FIG. 15 is a top view of a variable gravity compensation module with a curved lever in a high-torque mode.
Figure 16:
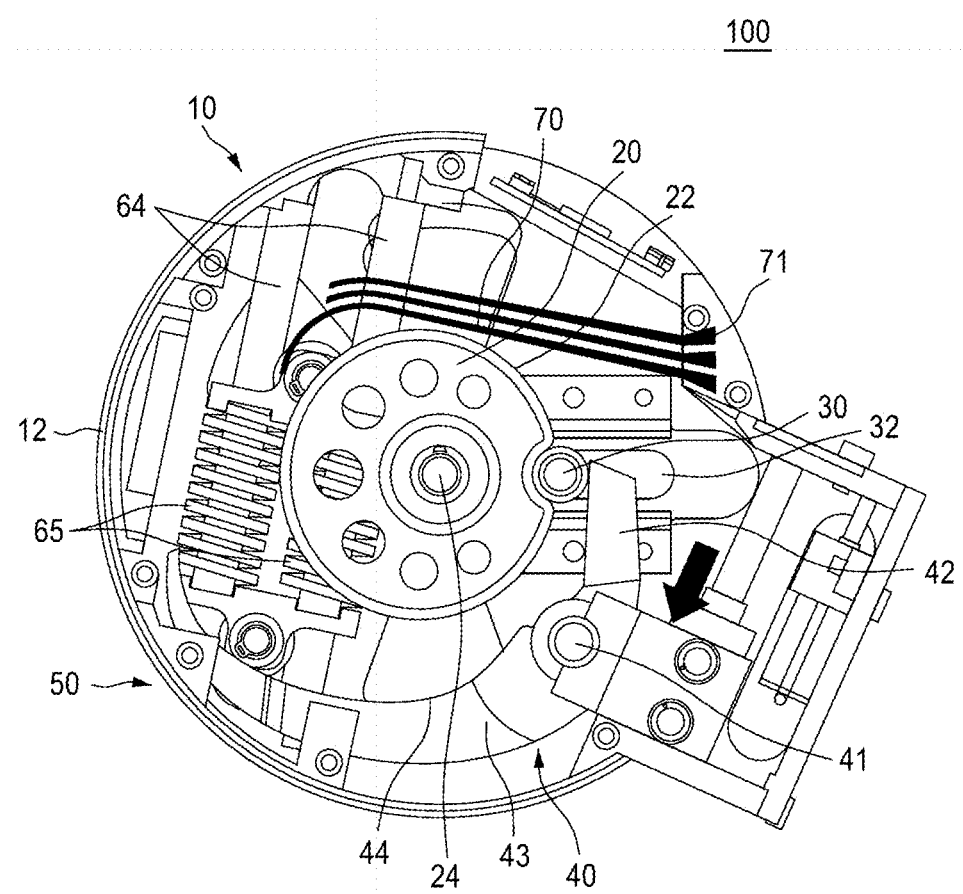
FIG. 16 is a top view of a variable gravity compensation module with a curved lever in a low-torque mode.

FIG. 15 is a top view of a variable gravity compensation module with a curved lever in a high-torque mode, and FIG. 16 is a top view of a variable gravity compensation module with a curved lever in a low-torque mode.

The adjustment unit 80 may be configured to include the adjustment portion guide 82 which is installed within the housing 10, the adjustment member 81 which is installed and fixed to the pivot 41 and slides along the adjustment member 81, and the driving motor 83 which drives a gear 84 and the adjustment member 81. Further, a battery 90 for supplying power may be equipped within the housing 10 and a control portion 110 for controlling operations may be also equipped within the housing 10.

Since torque may be changed according to the position of the pivot 4, adjustment of the position of the pivot 41 is significant. The pivot 41 may be moved to be close to or away from the cam follower 30, compensating high-torque force when being close to the cam follower 30 while compensating low-torque force when being away therefrom. Thus, when a user needs to compensate high-torque force, then he/she uses the variable gravity compensation apparatus 100 after moving and setting the pivot 41 to be close to the cam follower 30. Alternatively, when the user needs to compensate low-torque force, then he/she uses the variable gravity compensation apparatus after moving and setting the pivot to an opposition direction.

Accordingly, when torque magnitude variation is needed (torque variation mode), as the driving motor 83 is driven, the adjustment portion member 81 slides along the adjustment portion guide 82 to move the pivot 41, allowing varying torque magnitude.

At this time, as shown in FIG. 15 and FIG. 16, during the torque variation, i.e., even though the position of the pivot 41 is varied, it may be seen that the positions of the cam follower 20 and the first and second elastic followers 61 and 66 are not varied.

Therefore, since the position of the first elastic follower 61 is not varied during the torque variation, elastic energy of the complex elastic unit 50 is not supplied toward the adjustment unit 80, thereby varying torque through minimum energy.

Further, FIG. 13 shows an initial state of the variable gravity compensation apparatus 100 in which load does not work to the interlocking cam 20. In the initial state, as shown in FIG. 13, when the load works, the interlocking cam 20 is rotated in a clockwise direction. The interlocking cam 20 is also rotated in a counterclockwise direction according a working direction of the load (rotation of the curved lever 40 coupled to the interlocking cam 20). However, in this drawing, the clockwise rotation is explained as an example.

When the interlocking cam 40 is rotated 180 degrees in a clockwise direction as shown in FIG. 14, the cam follower 30 slides in a right direction interlocked with this rotation. Then, the curved lever 40 is rotated in a clockwise direction interlocked with the sliding of the cam follower 30, this is accomplished by rotation of the driving end 42 adhered to the cam follower 30.

The curved lever 40 is rotated as mentioned above, compressing the complex elastic in an upward direction, the elastic unit 50 provides elasticity to the initial position continuously.

When the load keeps working to the interlocking cam 20, the interlocking cam 20 is rotated more and the curved lever 40 is rotated in a clockwise direction further, and thus the interlocking cam 20 is supported by elasticity. In an embodiment of the present invention, as the curved lever 40 which is rotated interlocked with the cam surface 22 acts as a lever for the load working to the interlocking cam 20, it is allowable to compensate gravity in a small space, thereby minimizing and modulizing the apparatus.

Figure 17:
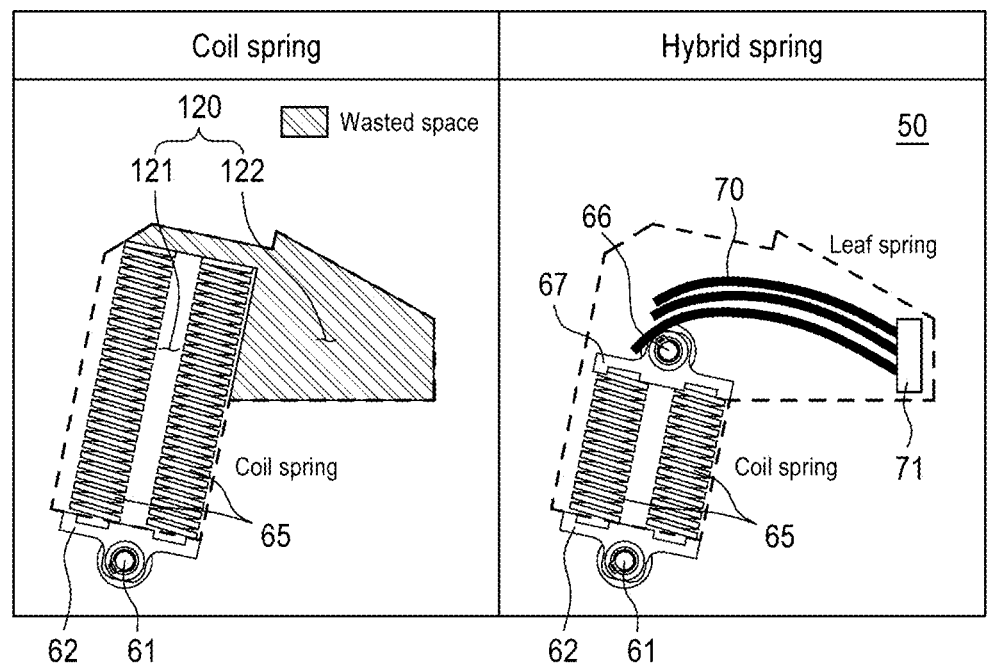
FIG. 17 is a top view showing a state that a coil spring and a hybrid spring are installed in an installation space region of an elastic unit according to an embodiment of the present invention.
Figure 18:
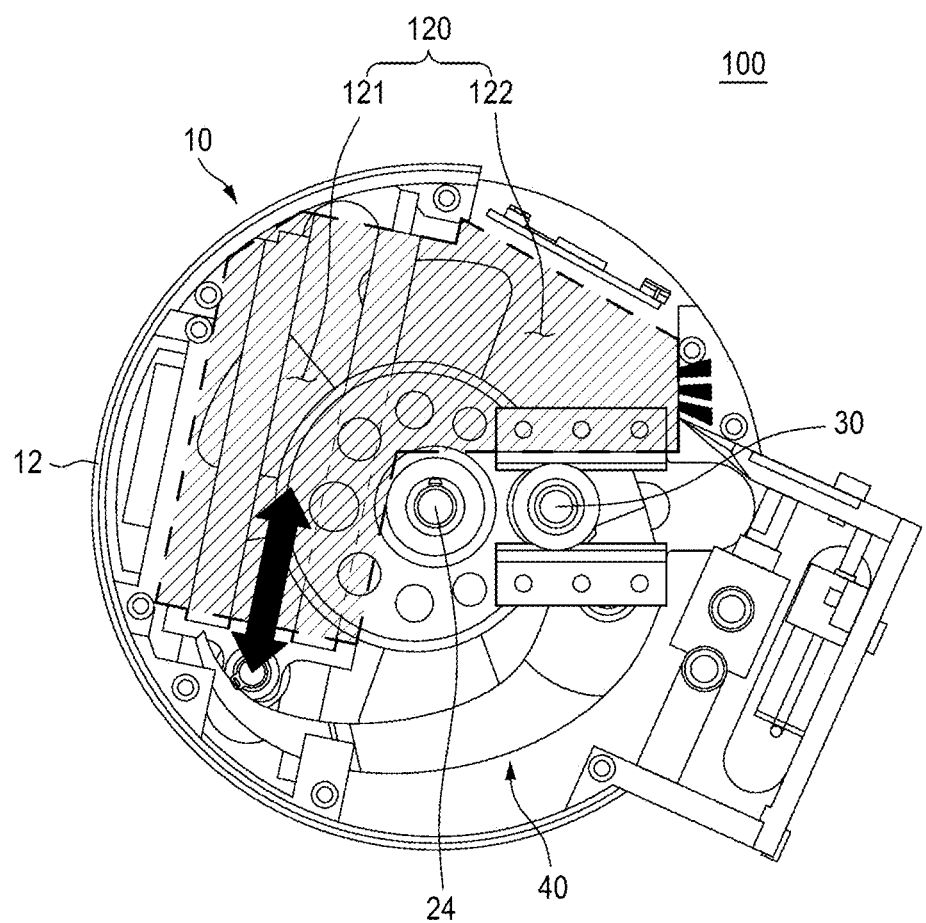
FIG. 18 is a top view of a variable gravity compensation module with a curved lever, in which an installation space region of an elastic unit is marked.

Hereinafter, described are configurations and function of the complex elastic unit 50 according to an embodiment of the present invention, as well as an installation method thereof. FIG. 17 is a top view showing a state that a coil spring and a hybrid spring are installed in a n installation space region of an elastic unit according to an embodiment of the present invention. FIG. 18 is a top view of a variable gravity compensation module with a curved lever, in which an installation space region of an elastic unit is marked.

Figure 19:
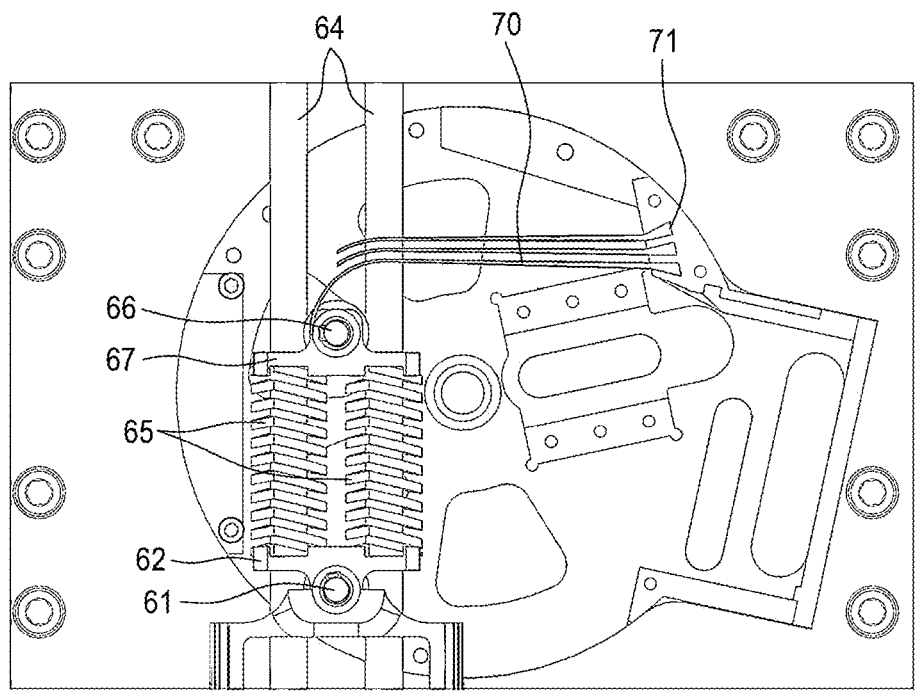
FIG. 19 is a top view of a complex elastic unit installed according to an embodiment of the present invention.
Figure 20:
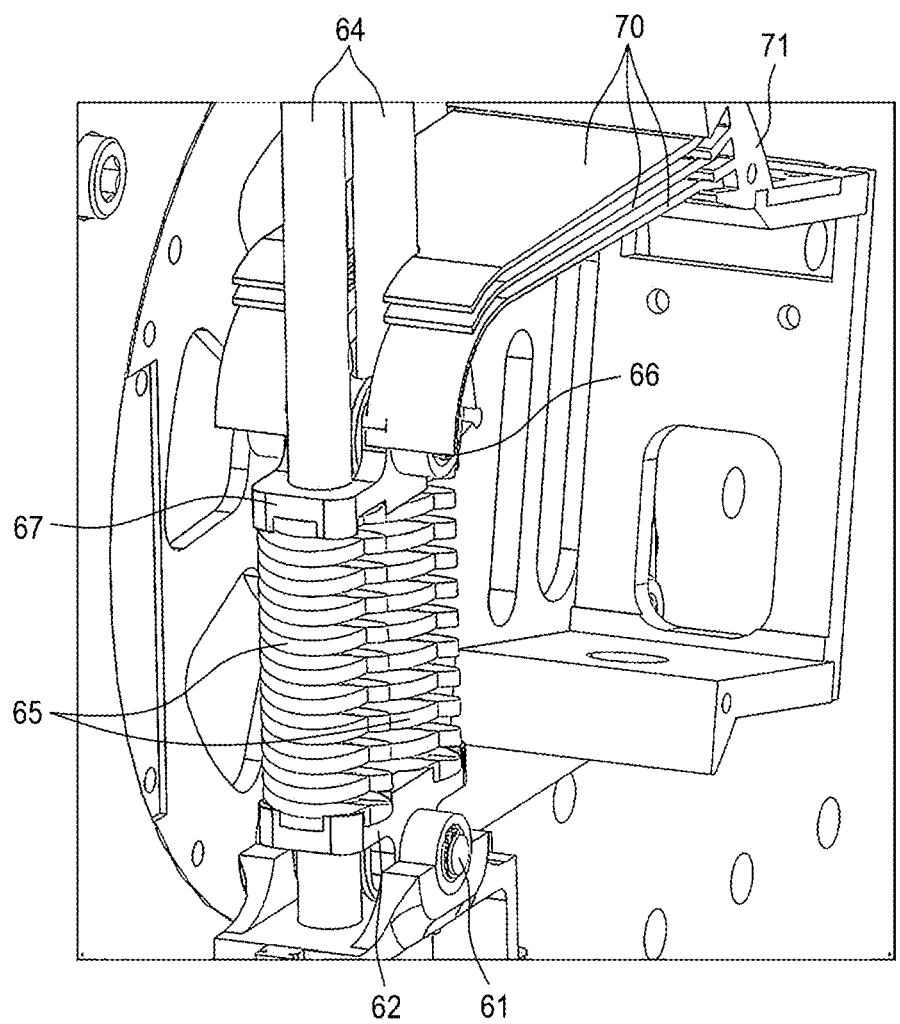
FIG. 20 is a perspective view of a complex elastic unit installed according to an embodiment of the present invention.

Further, FIG. 19 is a top view of a complex elastic unit installed according to an embodiment of the present invention and FIG. 20 is a perspective view of a complex elastic unit installed according to an embodiment of the present invention.

Figure 21:
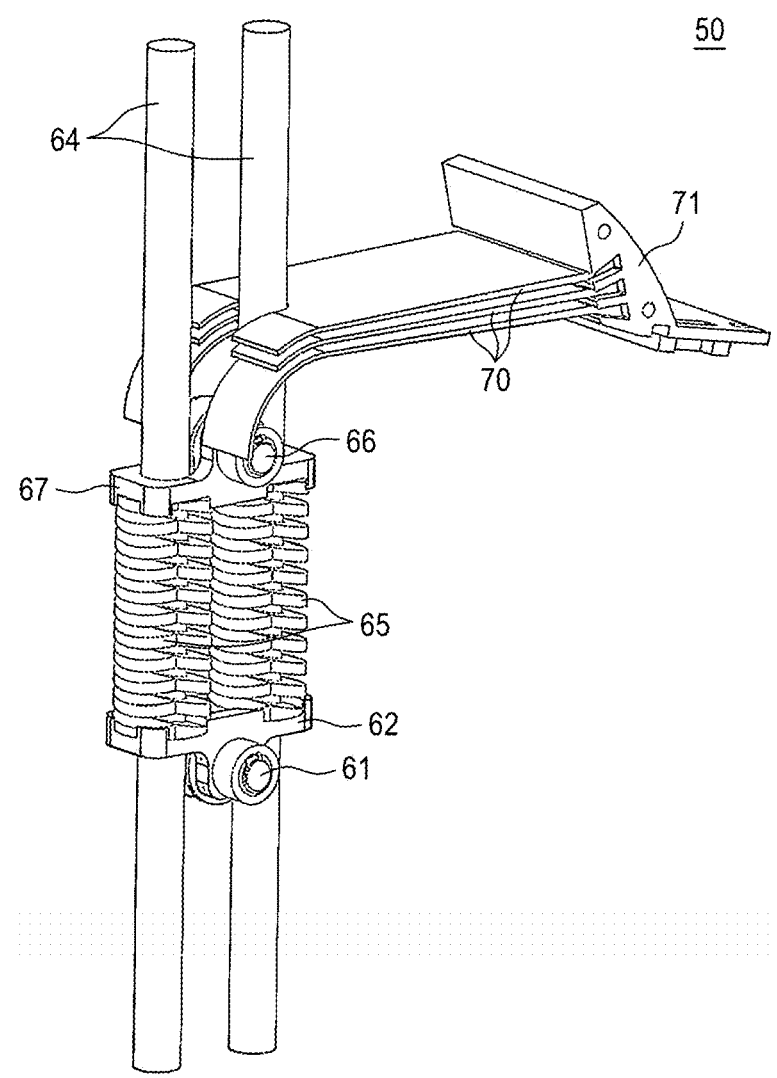
FIG. 21 is a perspective view of a complex elastic unit according to an embodiment of the present invention.
Figure 22:
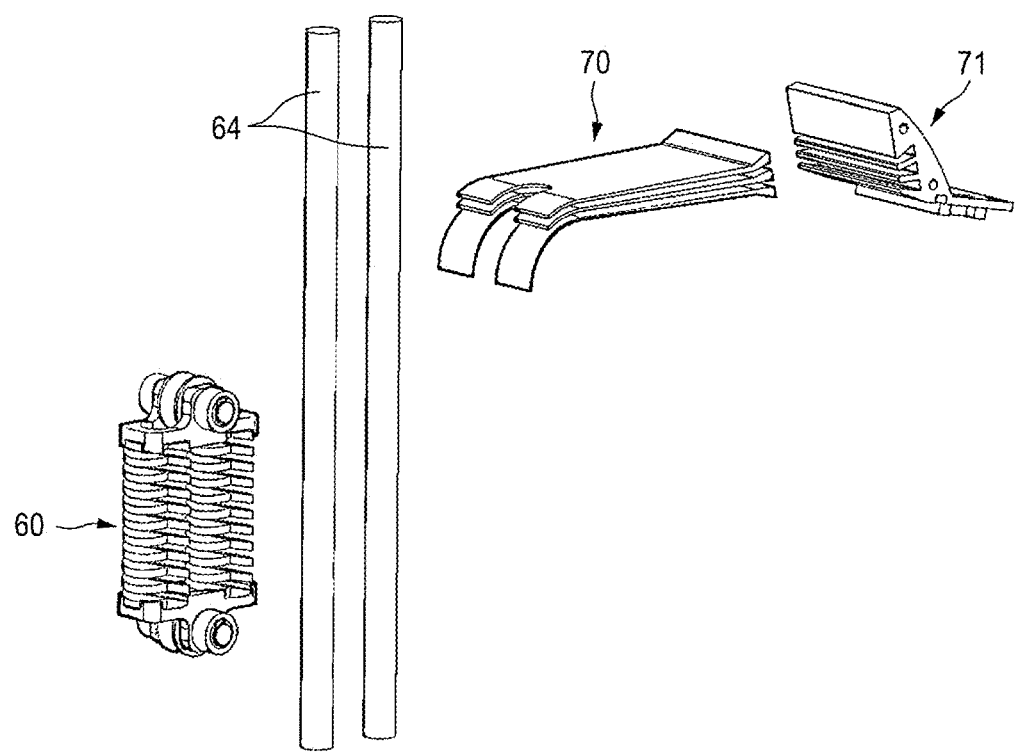
FIG. 22 is a dissembled perspective view of a complex elastic unit according to an embodiment of the present invention.
Figure 23:
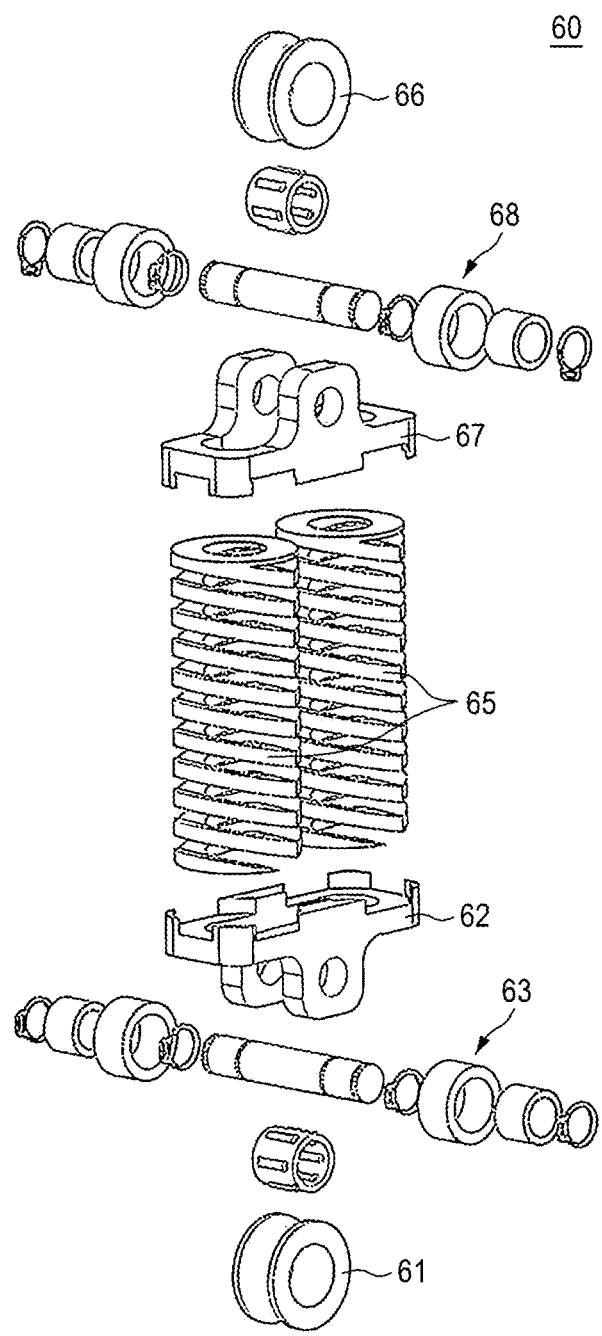
FIG. 23 is a disassembled perspective view of a coil spring set according to an embodiment of the present invention.
Figure 24:
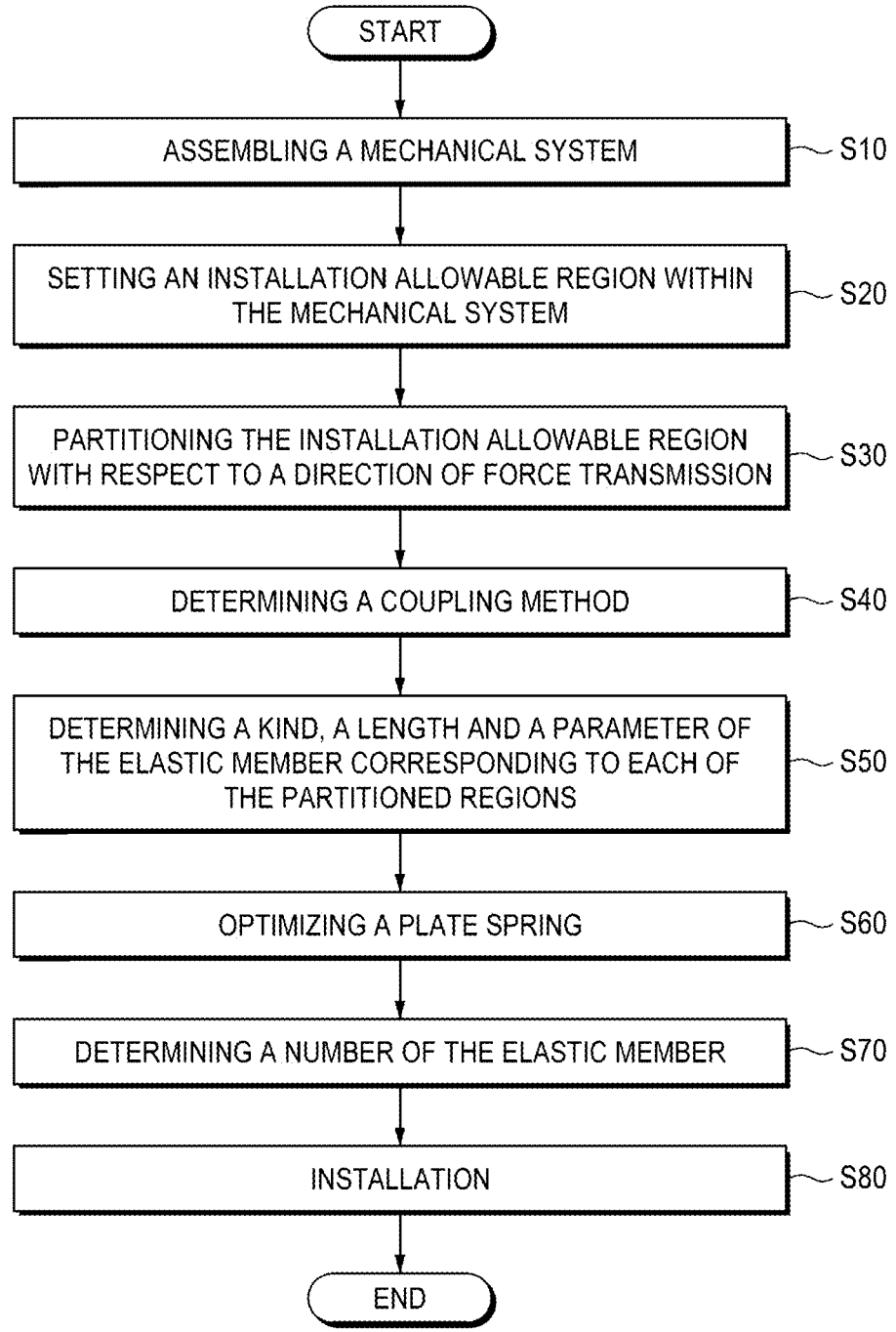
FIG. 24 is a flowchart of an installation method of a complex elastic unit according to an embodiment of the present invention.
Figure 25:
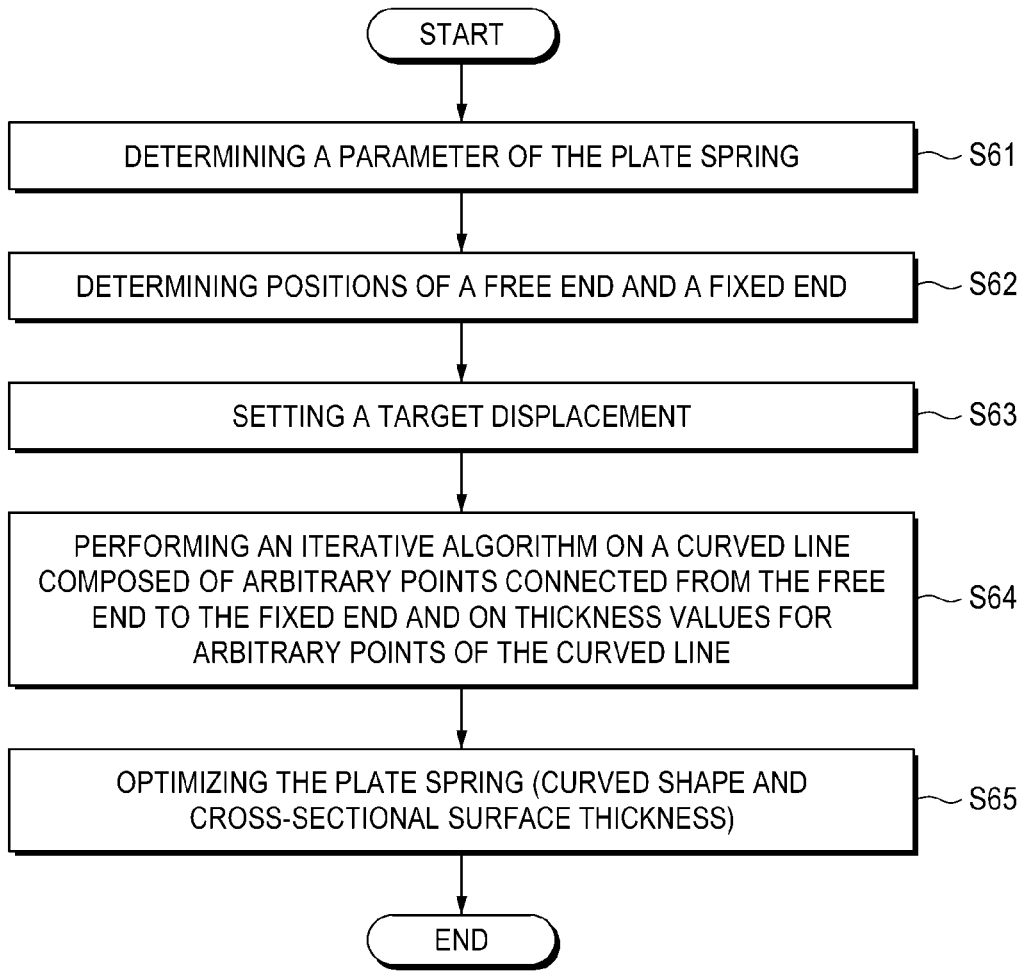
FIG. 25 is a flowchart of an optimization method of a plate spring according to an embodiment of the present invention.

FIG. 21 is a perspective view of a complex elastic unit according to an embodiment of the present invention, FIG. 22 is a dissembled perspective view of a complex elastic unit according to an embodiment of the present invention and FIG. 23 is a disassembled perspective view of a coil spring set according to an embodiment of the present invention, FIG. 24 is a flowchart of an installation method of a complex elastic unit according to an embodiment of the present invention, and FIG. 25 is a flowchart of an optimization method of a plate spring according to an embodiment of the present invention.

The elastic unit 50 according to an embodiment of the present invention is configured as the complex elastic unit 50 which is composed of combined, different elastic members.

Firstly, in an installation method of the complex elastic unit 50, configuration elements of the variable gravity compensation apparatus 100 besides the complex elastic unit 50 are installed and assembled S10.

Then, an installation region 120 where installation of the complex elastic unit 50 is allowable is set within this variable gravity compensation apparatus 100 S20. In the embodiment, this installation region 120 may be an 'L' shape as shown in FIG. 14 and FIG. 15.

The installation region 120 is partitioned into a plurality of regions with respect to a direction of force transmission S30. In the embodiment of the present invention, and the installation allowable region is divided into a first partitioned region 121 that is a space obtained in a parallel direction with respect to a direction of force transmission, and a second partitioned region 122 that is a space obtained in a perpendicular direction with respect to the direction of force transmission.

Then, a coupling part and a coupling method are determined S40. Following the determination of the coupling part and the coupling method, a kind, a length and a parameter of the elastic member may be determined corresponding thereto S50. That is, an elastic member corresponding to each of the partitioned regions 121, 122 is selected. In the embodiment of the present invention, a coil spring set 60 is selected for and adopted to the first partitioned region 121 which is parallel to the direction of force transmission while a plate spring 70 is selected for and adopted to the second partitioned region which is perpendicular to the direction of force transmission.

Then, a shape of the elastic member is optimized. A length and a parameter of the coil spring in the first partitioned region 121 may be determined according to a size of the coupling part.

Further, since the plate spring 70 to be disposed in the second portioned region 122 has high design freedom due to spring characteristics, a curved shape and a cross-sectional surface are subjected to optimization S60.

Then, the number of the elastic member is determined S70. In the embodiment of the present invention, a coil spring 65 and the plate spring 70 are disposed in series, the coil springs 65 are coupled to each other in parallel and the plate springs 70 are also coupled to each other in parallel to maximize elastic energy. The designed complex elastic unit 50 is installed within the installation region 120 S80.

The curved shape of and the thickness of the section surface of the plate spring 70 are optimized to maximize storable elastic energy. A relevant plate spring 70 performs the optimization by utilizing FEA (e.g. ABAQUS, ANSYS, etc.) and computing software.

As shown in FIG. 22, in the step of optimizing the plate spring 70 according to the embodiment of the present invention, a parameter of the plate spring 70 is determined S61 and positions of a free end and a fixed end are determined by the plate spring 70 in the space for installation S62.

Then, a target displacement which may have maximum elastic energy is set in a range in which a stiffness of the plate spring 70 is allowable S63. An iterative algorithm is performed on a curved line composed of arbitrary points connected from the free end to the fixed end and on thickness values for arbitrary points of the curved line S64, and then the curved shape of and a cross-sectional surface thickness of the plate spring are derived which are optimizable on the basis of the target displacement S65.

An object of the optimization to be achieved is to maximize elastic energy to be stored in a spring while not exceeding yield stress through optimal design of a plate spring shape and a cross-sectional profile. A relevant optimization is performed after displacement satisfied in the whole spring system is determined and then displacement related to a coil spring is determined (after that, a target displacement of a plate spring is determined).

The optimization of the plate spring is accomplished through interlocking with MATLAB and ABAQUS. An arbitrary design parameter, B-Spline is created in ATLAB and a longitudinal shape is formed on the basis of thereof. There are various limit conditions in order to identify whether or not the formed shape generates any interference with elements of CVGC. In a case that the limit condition is violated, a penalty is imposed. Alternatively, in a case that the limit condition is not violated, a relevant shape is transmitted to ABAQUS to perform analyzation. The optimization is performed in a way to minimize objective function ($\Phi=-F_{spring}$), wherein used optimization algorithm is GA.

The above-determined displacement of the plate spring which is used when a relevant shape is analyzed in ABAQUS is generated and analyzed, wherein it is allowable to obtain maximum stress and reaction force of the plate spring as compared to the amount of generated displacement. In a case of exceeding yield stress of $SUP_{10}$ which is a material of the plate spring, a penalty is imposed to a relevant shape. In addition, in a case that a contact with a case of CVGC occurs as determining whether or not to contact with the case, a penalty is also imposed to a relevant spring shape.

Therefore, in the embodiment of the present invention, as elastic members different from each other are utilized complexly, it is allowable to maximize the performance of the system using a limited installation space maximally.

Further, according to the embodiment of the present invention, since the elastic member is installed by utilizing a spare space existing within a mechanical system, it is allowable to minimize the mechanical system as a whole, wherein as the elastic member optimized for each space is used, it is allowable to design the maximization of elastic energy to be stored in the elastic member, consequently allowing minimizing the mechanical system utilizing the elastic member in the limited space and improving the performance thereof through maximizing the storable elastic energy.

A configuration of the complex elastic unit 50 is described in detail. The complex elastic unit 50 may be configured with at least one the coil spring set 60 in which coil springs 65 are connected in parallel and at least one the plate spring 70 which is disposed with the coil spring set in series.

The coil spring set 60 may be configured to include an elastic spring slot 64 into which each of the coil springs 65 is inserted, a first elastic follower 61 which is coupled to an end of one side of the coil spring and a second follower 66 coupled to an end of another side thereof. The first elastic follower 61 is contacted with the curved surface 44 of the driven end of the curved lever 40 and the second elastic follower 66 is contacted with the free end of the plate spring 70.

Further, the coil spring set 60 includes, in one side, a first guide 62 to which the first elastic follower 61 is coupled and which is coupled to one end of the coil spring 65 and thus the first elastic follower 61 may be assembled to the first guide 62 through a first assembly portion 63.

Further, the coil spring set 60 is installed with a second guide 67 in another side and thus the second elastic follower 66 is coupled to the second guide 67 through second assembly portion 68.

Further, an end of one side of the plate spring 70, i.e., a free end is contacted to the second elastic follower 66, and an end of another side thereof, i.e., a fixed end is coupled to a plate spring-fixing portion 71 which is fixed to the housing 10.

Figure 26:
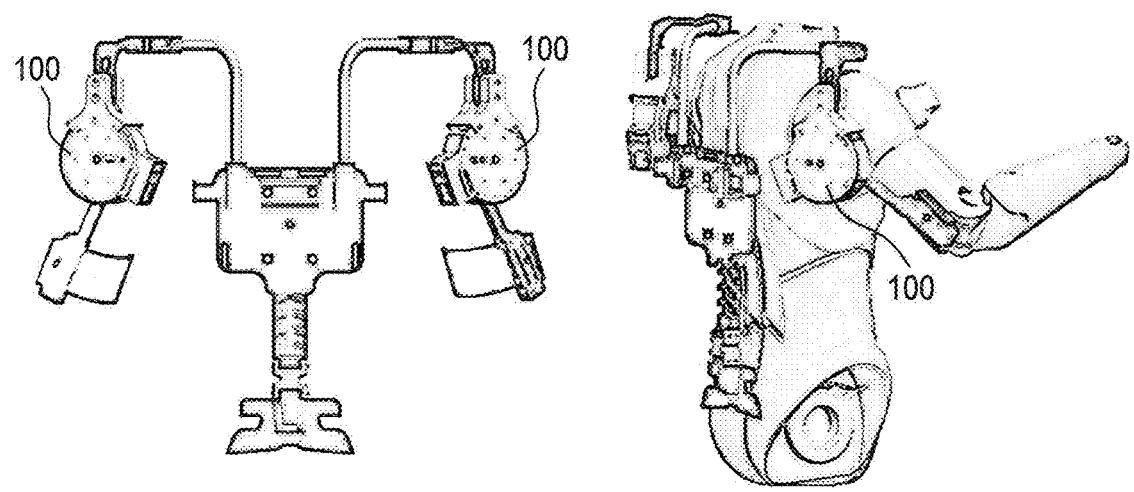
FIG. 26 shows a shoulder exoskeleton robot adopting a variable gravity compensation module with a curved lever accruing to an embodiment of the present invention.
Figure 27:
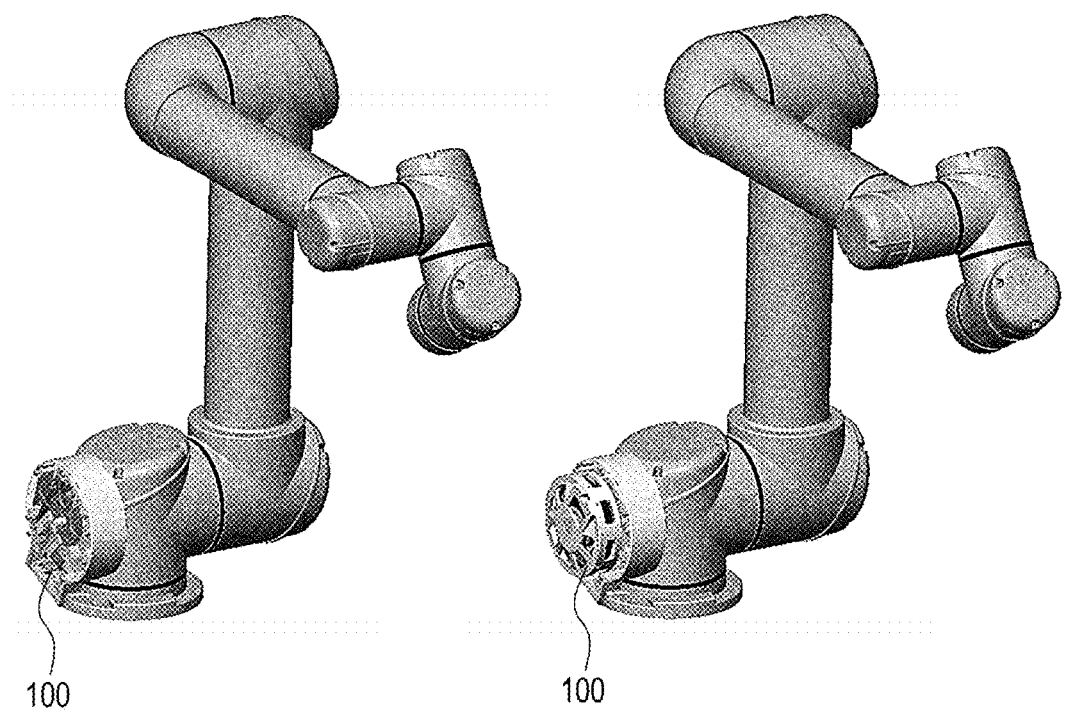
FIG. 27 shows a manipulator adopting a variable gravity compensation module with a curved lever accruing to an embodiment of the present invention.

FIG. 26 shows a shoulder exoskeleton robot adopting a variable gravity compensation module with a curved lever accruing to an embodiment of the present invention, and FIG. 26 shows a manipulator adopting a variable gravity compensation module with a curved lever accruing to an embodiment of the present invention.

The variable gravity compensation module with a curved lever according to an embodiment of the present invention is an independent module, as well as a crucial technology, which is applicable to various machine-robot systems which require gravity compensation. Representative embodiments include 'a gravity compensation module integrated actuator, 'a variable gravity compensation module-based shoulder exoskeleton robot' as shown in FIG. 26 and 'a variable gravity compensation module-based manipulator'.

Further, the aforementioned apparatus and method are not limited to configurations and methods of the above-described embodiments. Alternatively, the embodiments may be configured by selectively combining the whole of the respective embodiments or a part thereof to allow various modifications.

DESCRIPTION OF THE SYMBOLS

10: a housing
12: an exterior plate

20: an interlocking cam
22: a cam surface
24: a cam shaft
30: a cam follower
32: a cam follower slot
40: a curved lever
41: a pivot
42: a driving end
43: a driven end
44: a curved of a driven end
50: a complex elastic unit
60: a coil spring set
61: a first elastic follower
62: a first guide
63: a first assembly portion
64: an elastic spring slot
65: a coil spring
66: a second elastic follower
67: a second guide
68: a second assembly portion
70: a plate spring
71: a plate spring fixing-portion
80: an adjustment unit
81: an adjustment member
82: an adjustment portion guide
83: a driving motor
84: a gear
90: a battery
100: a variable gravity compensation apparatus with a curved lever
110: a control portion
120: a particular region (installation space) 121: a first partitioned region
122: a second partitioned region

What is claimed is:

1. A variable gravity compensation apparatus with a curved lever, the apparatus comprising:
    a housing;
    an interlocking cam which is installed to the housing, being rotated by a load;
    a curved lever which is rotated interlocked with the rotation of the interlocking cam and which provides elasticity to rotate the interlocking cam toward an initial position;
    an adjustment unit which adjusts a position of a pivot which is a center of rotation of the curved lever, allowing the pivot to move according to a strength of load; and
    an elastic unit which is equipped within the housing to provide elasticity to the curved lever, wherein
    a driving end which is adhered to the interlocking cam is formed on one end of the curved lever with respect to the pivot, a driven end which is adhered to an elastic follower equipped to the elastic unit is formed on the other end thereof, and the driven end is configured into a curved shape that a sectional side surface connecting the pivot to the elastic follower has a curvature,
    wherein a cam surface formed on an outer surface of the interlocking cam is formed to change a length of radius along a circumferential direction with respect to a center point, the housing is equipped with a cam follower which slides interlocked with the rotation of the interlocking cam, and the cam follower is adhered to the driving end,
    wherein a curved surface of the curved lever has a shape allowing neither the cam follower nor the elastic follower to be moved during a torque variation mode in which the position of the pivot is varied by the adjustment unit,
    wherein:
        in the housing, a cam follower slot in which the cam follower slides; and
        an elastic member slot which is equipped to one side of the elastic unit and along which a first elastic guide with an installed first elastic follower slides; are formed, respectively,
    wherein the elastic unit is configured with a coil spring set having at least two coil springs, in which at least one of the coil springs is connected in parallel with at least another of the coil springs, and at least one plate spring which is disposed in series with the coil spring set, and
    wherein, for each of one or more of the at least two coil springs of the coil spring set:
        the coil spring set further comprises an elastic spring slot into which the respective coil spring is inserted, a first elastic follower coupled to an end of one side of the respective coil spring and a second follower coupled to an end of another side of the respective coil spring.

2. The variable gravity compensation apparatus with a curved lever according to claim 1, wherein:
    the adjustment unit comprises an adjustment portion guide which is fixed and installed within the housing, an adjustment member which slides along the adjustment portion guide, and a driving motor which moves the adjustment member.

3. The variable gravity compensation apparatus with a curved lever according to claim 1, wherein:
    the coil spring set further comprises, in one side, a first guide to which the first elastic follower is coupled and which is coupled to the end of the one side of the respective coil spring and in another side, a second guide to which the second elastic follower is coupled and which is coupled to the end of the another side of the respective coil spring.

4. The variable gravity compensation apparatus with a curved lever according to claim 3, wherein:
    one side of the plate spring is contacted to the second elastic follower and another end thereof is coupled to a plate spring fixing-portion which is fixed to the housing.

5. The variable gravity compensation apparatus with a curved lever according to claim 4, wherein:
    during torque variation mode, the adjustment member moves along the adjustment portion guide by driving of the driving motor, varying a position of the pivot, and positions of the cam follower, the first elastic follower and the second elastic followers are not varied.

* * * * *